United States Patent
Lianto et al.

(10) Patent No.: US 12,138,742 B2
(45) Date of Patent: Nov. 12, 2024

(54) METHODS AND APPARATUS FOR PROCESSING A SUBSTRATE

(71) Applicants: Applied Materials, Inc., Santa Clara, CA (US); NATIONAL UNIVERSITY OF SINGAPORE, Singapore (SG)

(72) Inventors: Prayudi Lianto, Singapore (SG); Guan Huei See, Singapore (SG); Arvind Sundarrajan, Singapore (SG); Andrivo Rusydi, Singapore (SG); Muhammad Avicenna Naradipa, Singapore (SG)

(73) Assignees: Applied Materials, Inc.; NATIONAL UNIVERSITY OF SINGAPORE, Singapore (SG)

( * ) Notice: Subject to any disclaimer, the term of this patent is extended or adjusted under 35 U.S.C. 154(b) by 553 days.

(21) Appl. No.: 17/176,839

(22) Filed: Feb. 16, 2021

(65) Prior Publication Data
US 2022/0258304 A1 Aug. 18, 2022

(51) Int. Cl.
*B24B 57/02* (2006.01)
*G01N 21/21* (2006.01)

(52) U.S. Cl.
CPC ............ *B24B 57/02* (2013.01); *G01N 21/211* (2013.01); *G01N 2021/213* (2013.01)

(58) Field of Classification Search
CPC ....... B24B 57/02; B24B 49/045; B24B 49/10; B24B 49/12; G01N 21/211; G01N 2021/213; G01N 21/9501
USPC ......................................... 451/5, 6, 8, 41, 60
See application file for complete search history.

(56) References Cited

U.S. PATENT DOCUMENTS

| | | | |
|---|---|---|---|
| 5,739,909 A | 4/1998 | Blayo et al. | |
| 6,356,347 B1 * | 3/2002 | Watanabe | G01B 11/303 |
| | | | 250/225 |
| 6,462,817 B1 | 10/2002 | Strocchia-Rivera | |
| 6,694,284 B1 | 2/2004 | Nikoonahad et al. | |
| 7,158,221 B2 | 1/2007 | Davis et al. | |
| 7,295,313 B1 | 11/2007 | Johs et al. | |
| 7,414,721 B1 | 8/2008 | Suvkhanov et al. | |
| 7,561,282 B1 | 7/2009 | Widmann | |
| 8,013,997 B2 | 9/2011 | Nabatova-Gabain et al. | |
| 10,460,924 B2 * | 10/2019 | Fliegel | H01L 29/20 |
| 2002/0125905 A1 * | 9/2002 | Borden | G01N 21/171 |
| | | | 257/E21.53 |
| 2016/0061585 A1 * | 3/2016 | Seo | G01B 11/065 |
| | | | 356/369 |

(Continued)

OTHER PUBLICATIONS

International Search Report for PCT/US2022/011940, dated May 6, 2022.

*Primary Examiner* — Robert F Neibaur
(74) *Attorney, Agent, or Firm* — MOSER TABOA

(57) ABSTRACT

Methods and apparatus for processing a substrate are provided herein. For example, a method of processing a substrate using extended spectroscopic ellipsometry (ESE) includes directing a beam from an extended spectroscopic ellipsometer toward a surface of a substrate for determining in-situ ESE data therefrom during substrate processing, measuring a change of phase and amplitude in determined in-situ ESE data, and determining various aspects of the surface of the substrate using simultaneously complex dielectric function, optical conductivity, and electronic correlations from a measured change of phase and amplitude in the in-situ ESE data.

20 Claims, 6 Drawing Sheets

(56) References Cited

U.S. PATENT DOCUMENTS

| | | | |
|---|---|---|---|
| 2016/0069792 A1* | 3/2016 | O'Mullane | G01N 21/956 |
| | | | 257/48 |
| 2019/0033211 A1* | 1/2019 | Neil | G01N 21/211 |
| 2019/0242938 A1* | 8/2019 | Dai | G01N 21/8422 |
| 2020/0083080 A1* | 3/2020 | Clark | H01L 21/67161 |
| 2020/0333188 A1* | 10/2020 | Gu | G01N 21/211 |

* cited by examiner

METHODS AND APPARATUS FOR PROCESSING A SUBSTRATE

FIELD

Embodiments of the disclosure generally relate to methods and apparatuses for processing substrates. More particularly, embodiments of the disclosure relate to surface/interface characterization in semiconductor substrate process.

BACKGROUND

Substrate (wafer) fabrication can include one or more processes. For example, substrate fabrication can include using one or more deposition processes (e.g., physical vapor deposition (PVD), chemical vapor deposition (CVD), atomic layer deposition (ALD), etc.), one or more etch processes (e.g., wet etch, dry etch, etc.), and one or more polishing processes (e.g., chemical mechanical polishing (CMP) or other suitable polishing processes). Conventional methods and apparatus are configured for surface/interface characterization to detect cleanliness of a surface of interest. Such methods and apparatus, however, are, typically, configured to perform surface/interface characterization at an end (completion) of each process, which can be highly destructive to the surface of interest.

SUMMARY

Methods and apparatus for processing a substrate are provided herein. In some embodiments, a method for processing a substrate includes directing a beam from an extended spectroscopic ellipsometer toward a surface of a substrate for determining in-situ ESE data therefrom during substrate processing, measuring a change of phase and amplitude in determined in-situ ESE data, and determining various aspects of the surface of the substrate using simultaneously complex dielectric function, optical conductivity, and electronic correlations from a measured change of phase and amplitude in the in-situ ESE data.

In accordance with at least some embodiments, a non-transitory computer readable storage medium has stored thereon instructions that when executed by a processor perform a method for processing a substrate using extended spectroscopic ellipsometry (ESE). The method for processing a substrate includes directing a beam from an extended spectroscopic ellipsometer toward a surface of a substrate for determining in-situ ESE data therefrom during substrate processing, measuring a change of phase and amplitude in determined in-situ ESE data, and determining various aspects of the surface of the substrate using simultaneously complex dielectric function, optical conductivity, and electronic correlations from a measured change of phase and amplitude in the in-situ ESE data.

In accordance with at least some embodiments, an apparatus for processing a substrate includes a processing platform for processing a substrate and an extended spectroscopic ellipsometer operably coupled to the processing platform and configured to direct a beam toward a surface of the substrate for determining in-situ ESE data therefrom during substrate processing, measure a change in determined in-situ ESE data, and determine various aspects of the surface of the substrate using simultaneously complex dielectric function, optical conductivity, and electronic correlations from a measured change of phase and amplitude in the in-situ ESE data.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
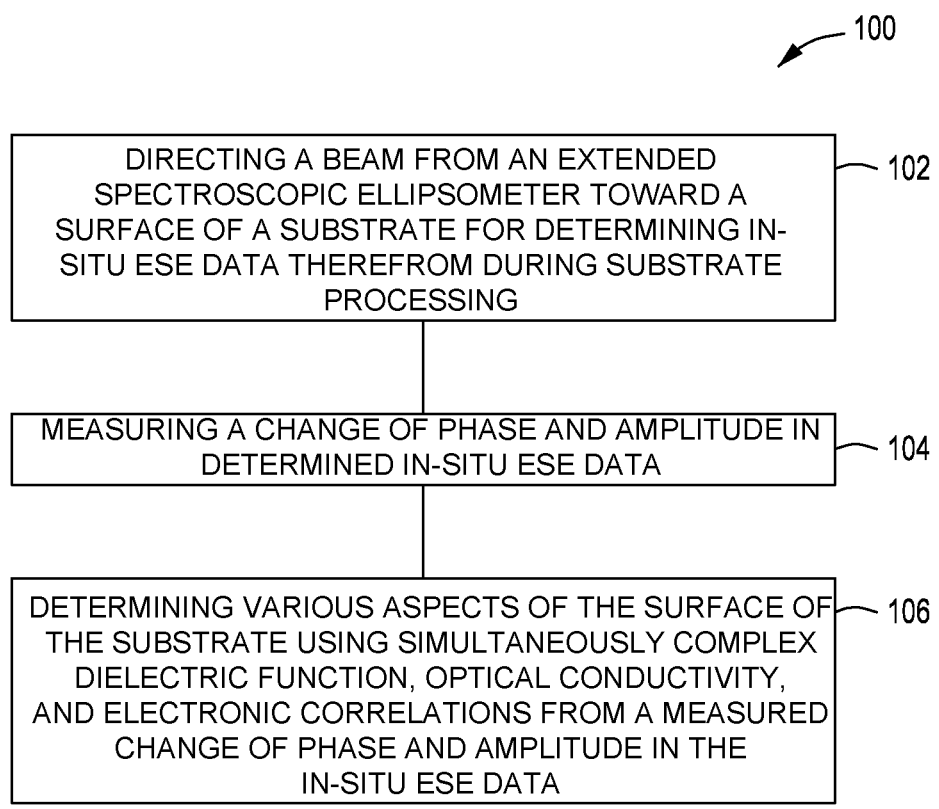
FIG. 1 is a flowchart of a method of processing a substrate in accordance with at least some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of a methods and apparatus are provided herein. For example, methods and apparatus of the disclosure are directed to surface/interface characterization in semiconductor substrate processes. For example, in at least some embodiments, methods and apparatus described herein are configured to perform extended spectroscopic ellipsometry (ESE) in real-time during one or more substrate fabrication processes, such as PVD, CVD, wet/dry etching, polishing processes (e.g., chemical mechanical polishing process), etc. For example, the methods and apparatus described herein can provide real-time measurements of surface/interface cleanliness using simultaneously complex dielectric function, optical conductivity, and electronic correlations measured by ESE. The complex dielectric function, optical conductivity, and electronic correlations can be used to probe various levels of surface/interface conductivity to detect at least one of contamination of a polymer surface, e.g., titanium contaminant (organic) from about 1% to about 9%, contact resistance (e.g., in the Ω to mΩ range), or leakage current (e.g., in the mA to the pA range). As the methods and apparatus described herein use ESE to monitor one or more surfaces of interest in real-time during one or more of the above-described substrate fabrication processes, as opposed to at the end of the substrate fabrication processes, destruction to the surfaces of interest is greatly reduced, if not eliminated.

Figure 2:
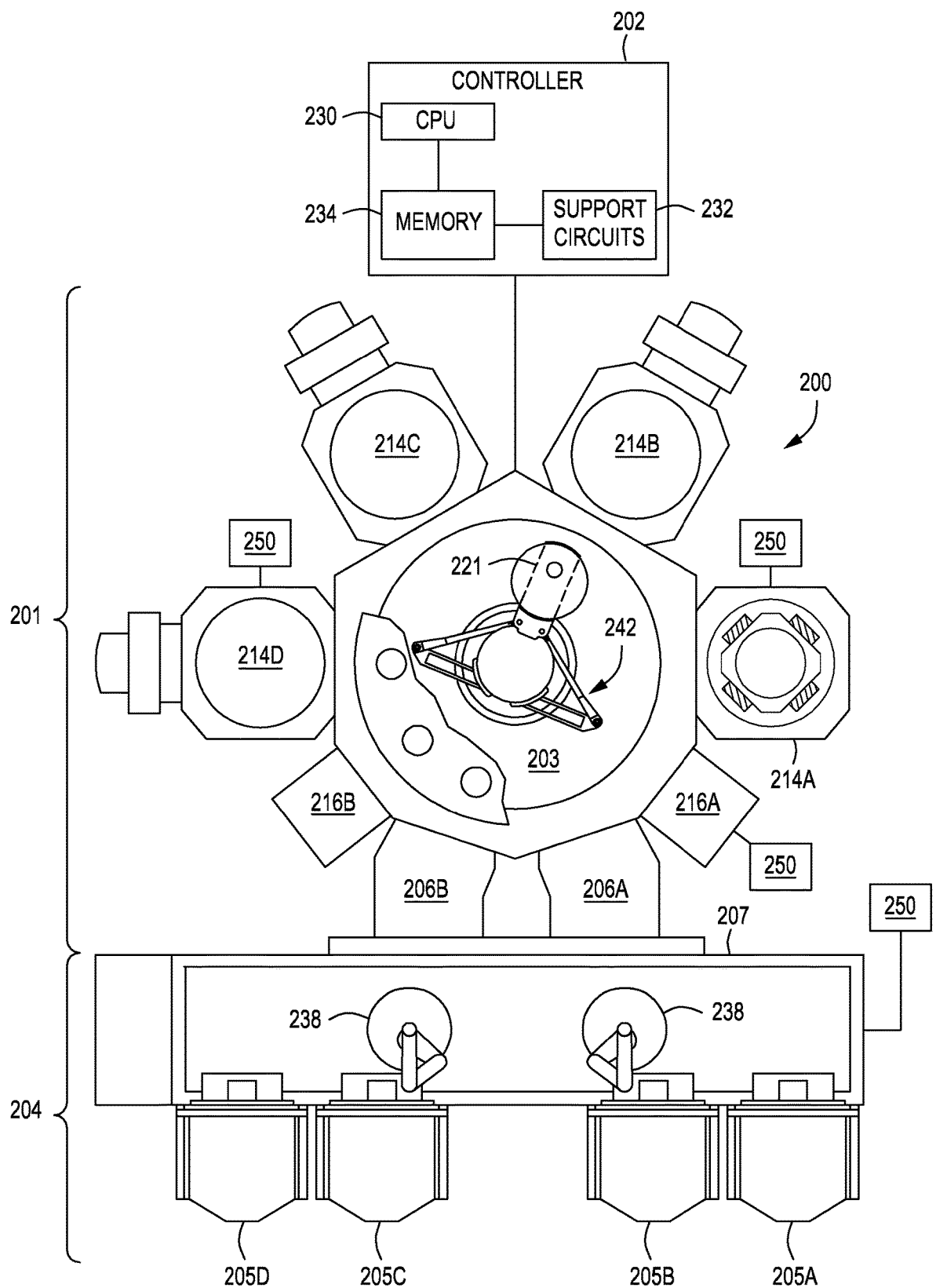
FIG. 2 is a diagram of an apparatus in accordance with at least some embodiments of the present disclosure.

FIG. 1 is a flowchart of a method 100 for processing a substrate, and FIG. 2 is a tool 200 (or apparatus) that can used for carrying out the method 100, in accordance with at least some embodiments of the present disclosure.

The method 100 may be performed in the tool 200 including any suitable process chambers configured for one or more of physical vapor deposition (PVD), chemical vapor deposition (CVD), such as plasma-enhanced CVD (PECVD) and/or atomic layer deposition (ALD), such as plasma-enhanced ALD (PEALD) or thermal ALD (e.g., no plasma formation), pre-clean chambers, wet etch of dry etch chambers, or CMP chambers. Exemplary processing systems that may be used to perform the inventive methods disclosed herein are commercially available from Applied Materials, Inc., of Santa Clara, California. Other process chambers, including those from other manufacturers, may also be suitably used in connection with the teachings provided herein.

The tool 200 can be embodied in individual process chambers that may be provided in a standalone configuration or as part of a cluster tool, for example, an integrated described below with respect to FIG. 2. Examples of the integrated tool are available from Applied Materials, Inc., of Santa Clara, California. The methods described herein may be practiced using other cluster tools having suitable process chambers coupled thereto, or in other suitable process chambers. For example, in some embodiments, the inventive methods may be performed in an integrated tool such that there are limited or no vacuum breaks between processing steps. For example, reduced vacuum breaks may limit or prevent contamination (e.g., oxidation) of the titanium barrier layer or other portions of the substrate.

The integrated tool includes a processing platform 201 (vacuum-tight processing platform), a factory interface 204, and a controller 202. The processing platform 201 comprises multiple process chambers, such as 214A, 214B, 214C, and 214D operatively coupled to a transfer chamber 203 (vacuum substrate transfer chamber). The factory interface 204 is operatively coupled to the transfer chamber 203 by one or more load lock chambers (two load lock chambers, such as 206A and 206B shown in FIG. 2).

In some embodiments, the factory interface 204 comprises a docking station 207, a factory interface robot 238 to facilitate the transfer of one or more semiconductor substrates (wafers). The docking station 207 is configured to accept one or more front opening unified pod (FOUP). Four FOUPS, such as 205A, 205B, 205C, and 205D are shown in the embodiment of FIG. 2. The factory interface robot 238 is configured to transfer the substrates from the factory interface 204 to the processing platform 201 through the load lock chambers, such as 206A and 206B. Each of the load lock chambers 206A and 206B have a first port coupled to the factory interface 204 and a second port coupled to the transfer chamber 203. The load lock chamber 206A and 206B are coupled to a pressure control system (not shown) which pumps down and vents the load lock chambers 206A and 206B to facilitate passing the substrates between the vacuum environment of the transfer chamber 203 and the substantially ambient (e.g., atmospheric) environment of the factory interface 204. The transfer chamber 203 has a vacuum robot 242 disposed within the transfer chamber 203. The vacuum robot 242 is capable of transferring substrates 221 between the load lock chamber 206A and 206B and the process chambers 214A, 214B, 214C, and 214D.

In some embodiments, the process chambers 214A, 214B, 214C, and 214D, are coupled to the transfer chamber 203. The process chambers 214A, 214B, 214C, and 214D comprise at least an ALD chamber, a CVD chamber, a PVD chamber, an e-beam deposition chamber, an electroplating, electroless (EEP) deposition chamber, a pre-clean chamber, a wet etch chamber, a dry etch chamber, an anneal chamber, and/or other chamber suitable for performing the methods described herein.

In some embodiments, one or more optional service chambers (shown as 216A and 216B) may be coupled to the transfer chamber 203. The service chambers 216A and 216B may be configured to perform other substrate processes, such as degassing, bonding, chemical mechanical polishing (CMP), wafer cleaving, etching, plasma dicing, orientation, substrate metrology, cool down and the like.

In at least some embodiments, an extended spectroscopic ellipsometer 250 is operably coupled to the processing platform 201. For example, the extended spectroscopic ellipsometer 250 can be connected to one or more of the process chambers 214A, 214B, 214C, and 214D and/or one or both of the service chambers 216A and 216B. For illustrative purposes, the extended spectroscopic ellipsometer 250 is shown operably connected to the process chambers 214A and 214D and to the service chamber 216A. For example, in at least some embodiments, a swing arm (not shown) of the process chambers 214A, 214B, 214C, and 214D and/or one or both of the service chambers 216A and 216B can be configured to support/house the extended spectroscopic ellipsometer 250 In at least some embodiments, the extended spectroscopic ellipsometer 250 can be connected to the factory interface 204, e.g., for metrology/inspection.

The extended spectroscopic ellipsometer 250, under control of the controller 202, is configured to perform extended spectroscopic ellipsometry (ESE). For example, in at least some embodiments the extended spectroscopic ellipsometer 250 is configured to direct a beam toward a surface of a substrate for determining in-situ data therefrom during substrate processing. e.g., such as performing one or more of the above-described processes. In at least some embodiments, the extended spectroscopic ellipsometer 250 is configured to measure a change in determined in-situ data and determine various aspects of the surface of the substrate using simultaneously complex dielectric function, optical conductivity, and electronic correlations measured from changes in phase and amplitude of the in-situ extended spectroscopic ellipsometry (ESE) data (in-situ ESE data), as will be described in greater detail below.

The controller 202 controls the operation of the tool 200 using a direct control of the process chambers 214A, 214B, 214C, and 214D or alternatively, by controlling the computers (or controllers) associated with the process chambers 214A, 214B, 214C, and 214D and the tool 200. In operation, the controller 202 enables data collection and feedback from the respective chambers and systems to optimize performance of the tool 200. The controller 202 generally includes a central processing unit 230, a memory 234, and a support circuit 232. The central processing unit 230 may be any form of a general-purpose computer processor that can be used in an industrial setting. The support circuit 232 is conventionally coupled to the central processing unit 230 and may comprise a cache, clock circuits, input/output subsystems, power supplies, and the like. Software routines, such as processing methods as described above may be stored in the memory 234 (e.g., non-transitory computer readable storage medium having instructions stored thereon) and, when executed by the central processing unit 230, transform the central processing unit 230 into a controller 202 (specific purpose computer). The software routines may also be stored and/or executed by a second controller (not shown) that is located remotely from the tool 200.

Continuing with reference to FIG. 1, the method 100 uses ESE to characterize surface/interface cleanliness (e.g., endpoint sensing) on one or more surfaces of a substrate. For example, as noted above, the inventors have found that complex dielectric function, optical conductivity, and electronic correlations can be used to probe various levels of surface/interface conductivity to detect at least one of contamination of a polymer surface, e.g., titanium contaminant (metaloorganic compound) from about 1% to about 9%. The contaminant level can be directly correlated to downstream reliability performance, such as contact resistance (e.g., in the Ω to mΩ range), or leakage current (e.g., in the mA to the pA range), after devices are built on the substrate, thus offering a significant advantage from device performance and yield standpoint, e.g., performance and yield can be identified early before completion of a device the substrate, as opposed to the conventional methods of testing performance and yield after assembly (packaging).

Initially, a substrate 300 may be loaded into one or more of the Four FOUPS, such as 205A, 205B, 205C, and 205D. For example, in at least some embodiments, the substrate 300 can be loaded into FOUP 205A.

The method 100 comprises, at 102, directing a beam from an extended spectroscopic ellipsometer toward a surface of a substrate for determining in-situ ESE data therefrom during substrate processing.

Figure 3:
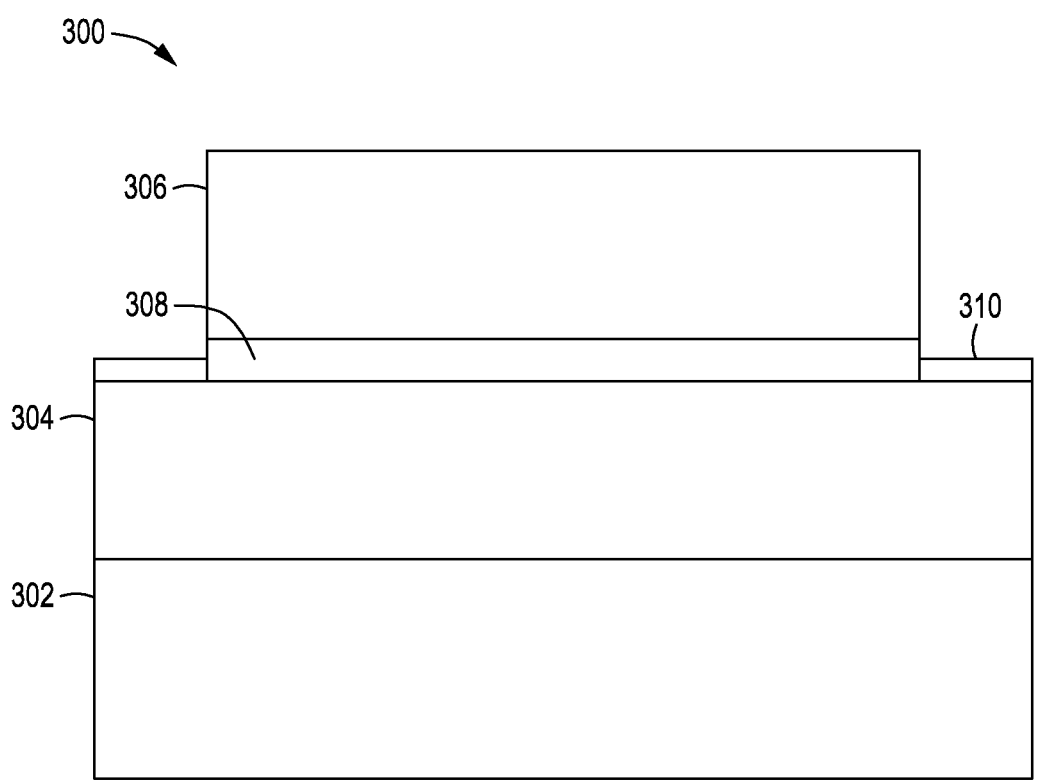
FIG. 3 is a diagram of a substrate in accordance with at least some embodiments of the present disclosure.

For example, in at least some embodiments, the method 100 can be configured for processing a substrate 300 (FIG. 3). The substrate 300 can have a base layer 302 made from one or more materials, such as silicon, germanium, glass, reconstituted wafer, panel, etc. In at least some embodiments, the base layer 302 can be made from silicon. Disposed atop the base layer 302 can be one or more layers of another material, e.g., depending on the envisioned use of the substrate. For example, in at least some embodiments, a layer 304 of one or more polymers may be deposited atop the base layer 302. Suitable polymers may include, but are not limited to, polyimide (PI), polybenzoxazole (PBO), epoxy mold compound (EMC), etc.

Figure 4A:
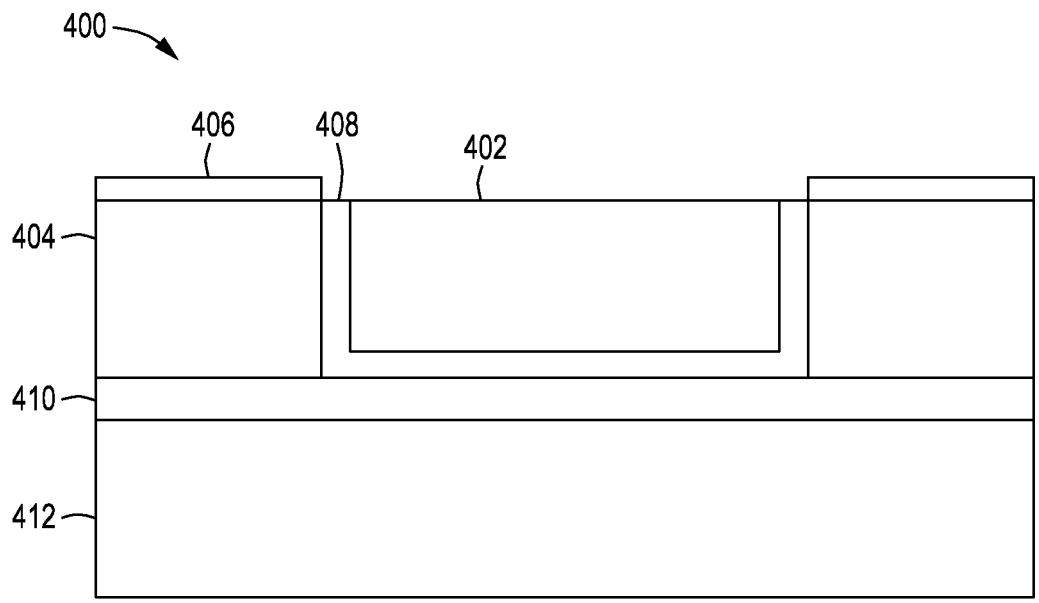
FIGS. 4A and 4B are diagrams of a substrate in accordance with at least some embodiments of the present disclosure.

In at least some embodiments, the method 100 can be configured for processing a substrate 400 (FIG. 4A) during a damascene process. For example, the damascene process may be used to create an embedded base layer 402 (e.g., layer of Cu) that is disposed atop a layer 408 of one or more suitable metals in a polymer layer 404 (polymer matrix) of the substrate 400. In at least some embodiments, the layer 408 can be a layer of titanium, tantalum, or other suitable metals. Disposed atop a base layer 412, e.g., silicon, can be a passivation layer, such as a dielectric passivation layer 410. During a damascene process (e.g., in the service chamber 216A), some Cu residue (or other contaminants, e.g., titanium, tantalum, etc.) may smear over the polymer layer 404 and form a layer 406 of contaminant that can form an electrical leakage current path. Accordingly, the method 100 can use ESE to monitor the contamination level of the layer 406 and provide an active endpoint feedback during the damascene process or other follow-up dry/wet clean processes.

Figure 4B:
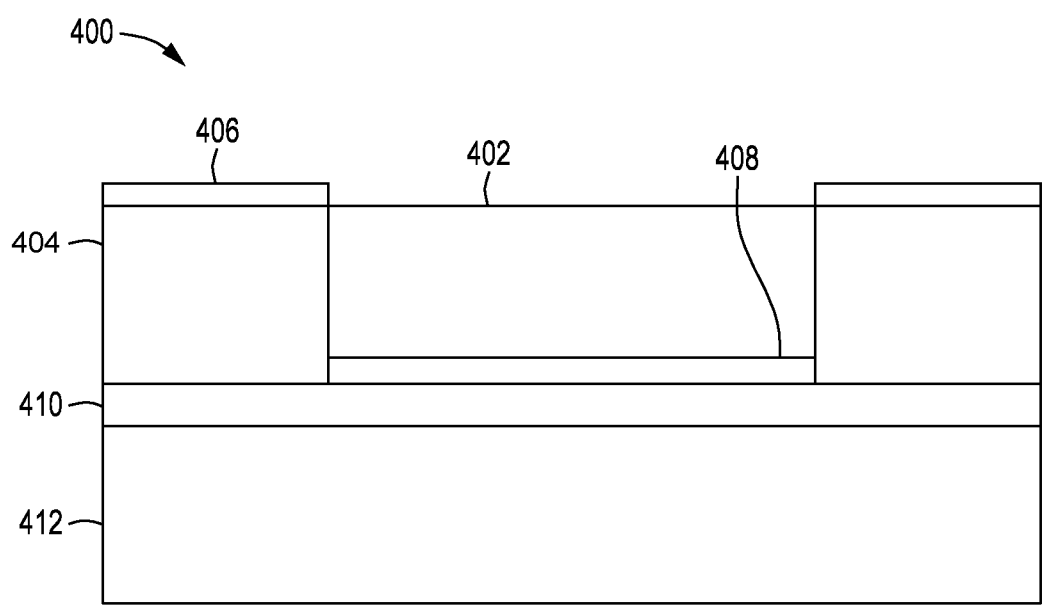

In at least some embodiments, the method 100 can be configured for processing the substrate 400 during a CMP process. For example, the layer 402 (e.g., Cu pillar/post/pad/RDL (FIG. 4B)) may be embedded in a polymer matrix (e.g., the polymer layer 404), whereby a CMP step is performed to reveal the layer 402 (e.g., Cu). During CMP reveal, some Cu (or other contaminants) may smear over the polymer layer 404 and provide an electrical leakage current path. Accordingly, the method 100 can use ESE to monitor the contamination level of the layer 406 and provide an active endpoint feedback during the CMP process or other follow-up dry/wet clean processes.

Figure 5:
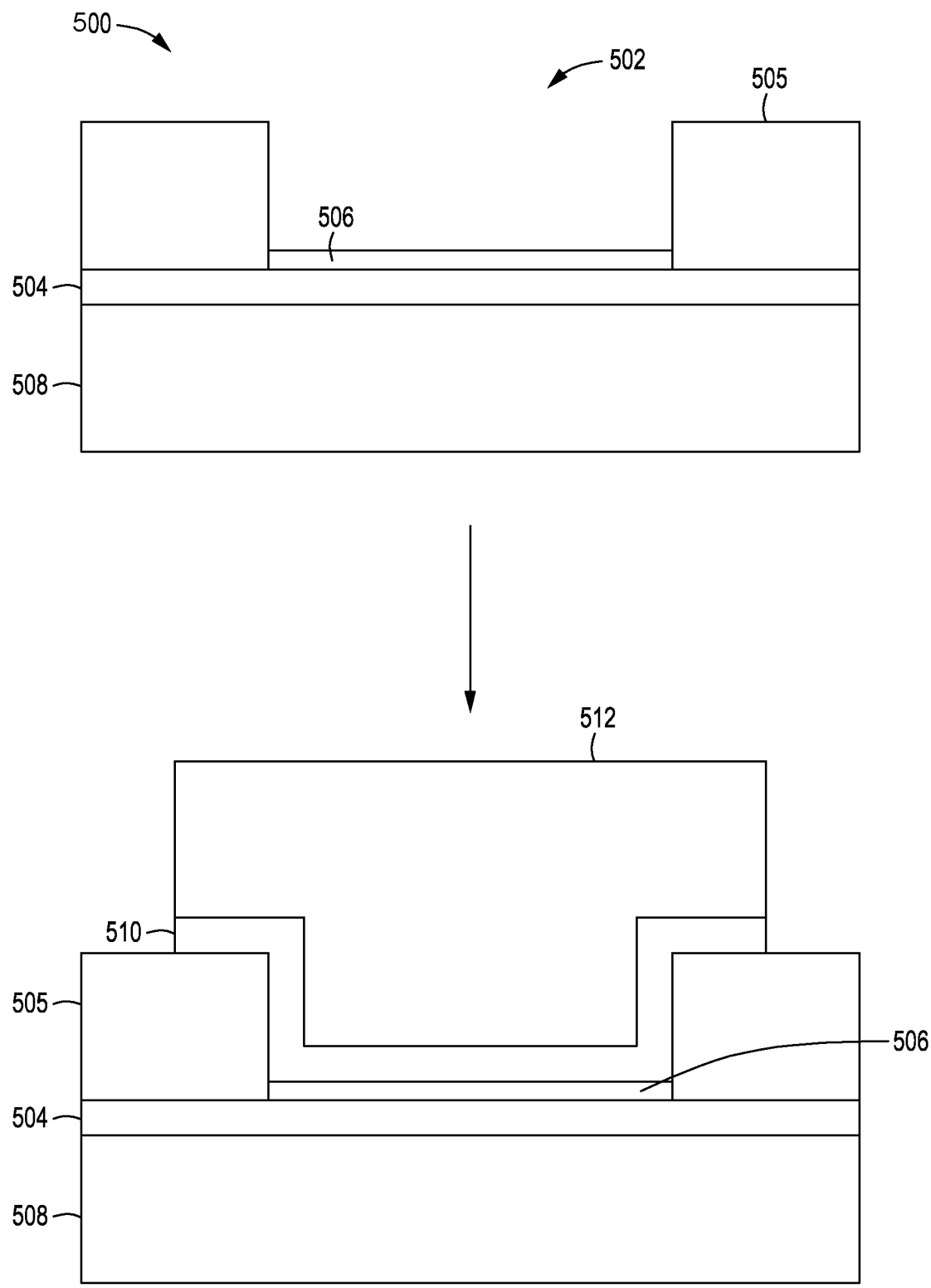
FIG. 5 is a diagram of a substrate in accordance with at least some embodiments of the present disclosure.
Figure 6:
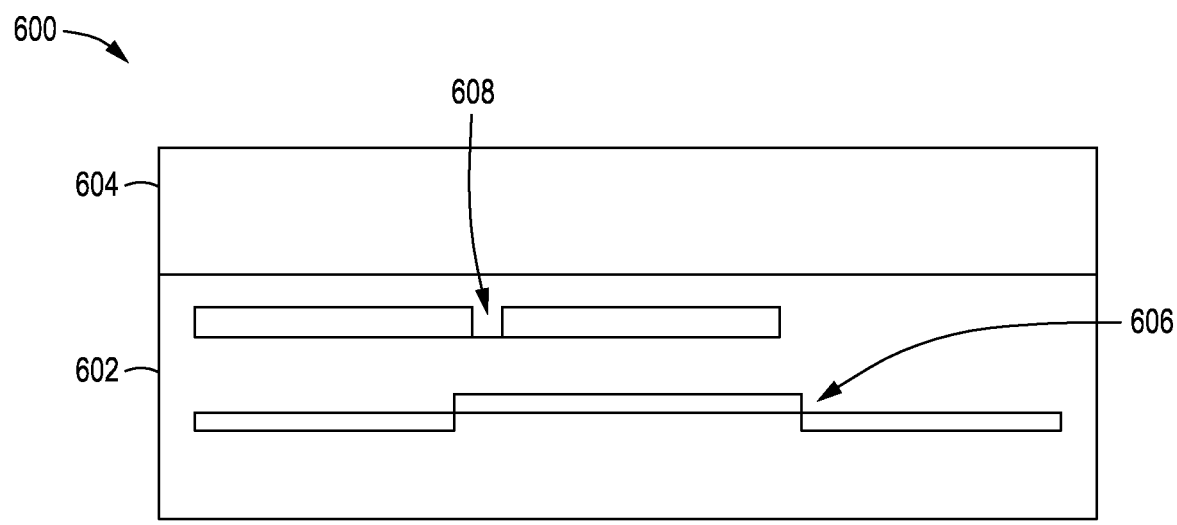
FIG. 6 is a diagram of a substrate in accordance with at least some embodiments of the present disclosure.

In at least some embodiments, the method 100 can be configured for processing a substrate 500 (FIG. 5) during a bump/RDL packaging process. For example, a polymer passivation via 502 can be formed atop a layer 504 (e.g., Al or Cu pad) on a substrate 500. For example, during forming of the polymer passivation via 502 (e.g., through a layer of polymer 505), some a contamination layer 506 (e.g., a polymeric residue) may form atop the layer 504 (or a base layer 508) of the polymer passivation via 502 prior to forming a barrier/seed layer 510 (e.g., formed using PVD) to form the bump/RDL 512. Accordingly, the method 100 can use ESE to monitor the contamination level of the contamination layer 506 and provide an active endpoint feedback for pre-clean process prior to PVD, thus ensuring that the formed bump/RDL 512 will have minimum to no contact resistance with the underlying metallization (e.g., the layer 504).

Continuing with reference to FIG. 1, for illustrative purposes, the method 100 is described in terms of processing the substrate 300. Once loaded, the factory interface robot 238 can transfer the substrate 300 from the factory interface 204 to the processing platform 201 through, for example, the load lock chamber 206A. The vacuum robot 242 can transfer the substrate 300 from the load lock chamber 206A to and from one or more of the process chambers 214A-214D and/or the service chambers 216A and 216B.

For example, in at least some embodiments, one or more metals, e.g., one of aluminum, copper, tantalum, titanium, etc., may be deposited atop the layer 304 of the substrate 300. For example, after the layer 304 is deposited atop the base layer 302, the substrate 300 can be transferred to one or more processing chambers for further processing. For example, in at least some embodiments, a semi-additive process (SAP) can be used to form a Cu redistribution layer 306 atop the layer 304. In such embodiments, after the Cu redistribution layer is deposited, the SAP process can use wet etch (e.g., in the process chamber 214A) to clear a layer 308 of titanium (Ti) that was previously deposited on the layer 304 (e.g., the PI field area). As can be appreciated, if the wet etch process is not properly controlled, a contaminant layer 310 (e.g., metallic residue such as Ti organometallic compound) may remain on the layer 304 (e.g., the polymer surface) and provide an unwanted electrical current leakage path. The contaminant layer 310 can have different levels of contamination, e.g., from about 1% to about 9%, and a thickness of about 1 nm to about 100 nm. Accordingly, the method 100 is configured to use ESE to probe the contaminant layer 310 and provide in-situ ESE feedback during the wet etch process to ensure adequate over-etch is performed to clear the contaminant layer 310.

For example, at 102, under the control of the controller 202, the extended spectroscopic ellipsometer 250 is configured to direct a beam toward the layer 304 on which the contaminant layer 310 is formed of the substrate 300 to determine in-situ ESE data, e.g., a phase and amplitude of the beam (or reflected beam), as will be described in greater detail below. In at least some embodiments, the extended spectroscopic ellipsometer 250 can direct the beam at one or more suitable angles to detect a level of contamination. The beam can be directed at an angle of incidence (incident angle) relative to the layer 304 of about 0 to about 70°. For example, in at least some embodiments, the angle of incidence can be about 45° to about 70°, and in at least some embodiments, can be about 50°. The photon energy of the beam can be about 1 eV to about 10 eV. For example, in at least some embodiments, the photon energy of the beam can be about 3.2 eV to about 6 eV, and in at least some embodiments, can be about 3.3 eV.

Next, at 104, the method 100 comprises measuring a change in determined in-situ ESE data. For example, under the control of the controller 202, the controller 202 measures a phase and amplitude of the transmitted beam and measures a change of phase and amplitude of the reflected beam detected by the extended spectroscopic ellipsometer 250.

Next, at 106, the method 100 comprises determining various aspects of the surface of the substrate using complex dielectric function, optical conductivity, and electronic correlations from a measured change of phase ($\Delta$) and amplitude ($\Psi$) from the in-situ ESE data. For example, in at least some embodiments, the controller 202 uses complex dielectric function, optical conductivity, and electronic correlations, which are obtained from the change of the phase and amplitude of the reflected beam to determine a level of contamination, a level of contact resistance, and/or a level of leakage current of the layer of 304 of the substrate 300. Electronic correlations, for example, can be used to obtain important information about surface, interface and/or defects, each of which have rich physical properties. For example, for a level of contamination, electronic correlations are different and yield a unique spectrum of complex dielectric function and optical conductivity, e.g., as a function of photon energy and polarization.

Next, if the controller 202 determines that the level of contamination (which can be correlated to downstream contact resistance and/or leakage current specification) of the layer of 304 is at a suitable predetermined amount, the substrate 300 can be transferred to, for example, the process chambers 214B-214D and/or the service chambers 216A and 216B for further processing. Conversely, if the controller 202 determines that the level of contamination of the layer of 304 is not at a suitable predetermined amount, extended wet etching or another suitable process can be performed on the substrate 300.

For example, in at least some embodiments, due to the persistence of the contaminant layer 310, additional processing, e.g., in a pre-clean chamber, may be required to clear the contaminant, and ESE can be used again to monitor the contaminant layer 310 during the pre-clean process until the contaminant layer 310 is fully cleared from the layer 304. In such an embodiment, the vacuum robot 242 can transfer the substrate 300 from the process chamber 214A to the process chamber 214D to perform a pre-clean process, e.g., to remove one or more contaminants described above.

Accordingly, once transferred to the process chamber 214D, one or more pre-clean processes can be performed. For example, the pre-cleaning process may be any process suitable to facilitate removal of any material from the surface of the layer 304 (or the base layer 302) as described above. In at least some embodiments, the substrate 300 may be exposed to a fluorine containing precursor and a hydrogen containing precursor in a two-part dry chemical cleaning process. In some embodiments, the fluorine containing precursor may comprise nitrogen trifluoride (NF3), hydrogen fluoride (HF), diatomic fluorine (F2), monatomic fluorine (F), fluorine-substituted hydrocarbons, combinations thereof, or the like. In some embodiments, the hydrogen containing precursors may comprise atomic hydrogen (H), diatomic hydrogen (H2), ammonia (NH3), hydrocarbons, incompletely halogen-substituted hydrocarbons, combinations thereof, or the like.

In at least some embodiments, the method 100 can be used on substrates that have at least one of vias, trenches, or interconnects. For example, a substrate 600 can include a base layer 602 made of one or more suitable metals, such as aluminum, copper, tantalum, titanium, etc. For example, in at least some embodiments, the base layer 602 can be a layer of copper having one or more vias or trenches 608, and/or interconnects 606. As described above, a layer 604 of contaminants can form on the base layer 602, and can have different levels of contamination, e.g., from about 1% to about 9%, and a thickness of about 1 nm to about 100 nm. Accordingly, the method 100 can be performed in conjunction with one or more other processes, e.g., wet etch, CMP, etc. For example, 102-106 can be carried out in the process chamber 214A and/or the service chamber 216A to perform a wet etch process and CMP process, respectively.

While the foregoing is directed to embodiments of the present disclosure, other and further embodiments of the disclosure may be devised without departing from the basic scope thereof.

The invention claimed is:

1. A method of processing a substrate using extended spectroscopic ellipsometry (ESE), comprising:
    directing a beam from an extended spectroscopic ellipsometer toward a surface of a first layer of a substrate for determining in-situ ESE data therefrom during substrate processing;
    measuring a change of phase and amplitude in determined in-situ ESE data; and
    prior to depositing a second layer atop the first layer, determining a level of contamination of the surface of the substrate using simultaneously complex dielectric function, optical conductivity, and electronic correlations from a measured change of phase and amplitude in the in-situ ESE data to provide an active endpoint feedback to ensure that there is minimum to no contact resistance between the second layer and the first layer.

2. The method of claim 1, wherein the in-situ ESE data comprises a change of a phase and an amplitude of a reflected beam.

3. The method of claim 1, further comprising correlating the level of contamination to at least one of a level of contact resistance or a level of leakage current.

4. The method of claim 1, wherein directing the beam comprises directing the beam toward the surface of the substrate at an incident angle of about 0° to about 70°.

5. The method of claim 1, wherein directing the beam comprises directing the beam toward the surface of the substrate at an incident angle of about 45° to about 50°.

6. The method of claim 1, wherein the beam has a photon energy of about 1 eV to about 10 eV.

7. The method of claim 1, wherein the beam has a photon energy of about 3.2 eV to about 6 eV.

8. The method of claim 1, wherein substrate processing comprises at least one of performing a pre-clean process, a wet etch process, or a chemical mechanical polishing process.

9. The method of claim 1, wherein the substrate comprises one of aluminum, copper, tantalum, titanium, or a polymer.

10. The method of claim 1, wherein the surface of the substrate comprises at least one of vias, trenches, or interconnects.

11. A non-transitory computer readable storage medium having stored thereon instructions that when executed by a processor perform a method for processing a substrate using extended spectroscopic ellipsometry (ESE), the method comprising:

directing a beam from an extended spectroscopic ellipsometer toward a surface of a first layer of a substrate for determining in-situ ESE data therefrom during substrate processing;

measuring a change of phase and amplitude in determined in-situ ESE data; and prior to depositing a second layer atop the first layer, determining a level of contamination of the surface of the substrate using simultaneously complex dielectric function, optical conductivity, and electronic correlations from a measured change of phase and amplitude in the in-situ ESE data to provide an active endpoint feedback to ensure that there is minimum to no contact resistance between the second layer and the first layer.

12. The non-transitory computer readable storage medium of claim 11, wherein the in-situ ESE data comprises a change of a phase and an amplitude of a reflected beam.

13. The non-transitory computer readable storage medium of claim 11, further comprising correlating the level of contamination to at least one of a level of contact resistance or a level of leakage current.

14. The non-transitory computer readable storage medium of claim 11, wherein directing the beam comprises directing the beam toward the surface of the substrate at an incident angle of about 0° to about 70°.

15. The non-transitory computer readable storage medium of claim 11, wherein directing the beam comprises directing the beam toward the surface of the substrate at an incident angle of about 45° to about 50°.

16. The non-transitory computer readable storage medium of claim 11, wherein the beam has a photon energy of about 1 eV to about 10 eV.

17. The non-transitory computer readable storage medium of claim 11, wherein the beam has a photon energy of about 3.2 eV to about 6 eV.

18. The non-transitory computer readable storage medium of claim 11, wherein substrate processing comprises at least one of performing a pre-clean process, a wet etch process, or a chemical mechanical polishing process.

19. The non-transitory computer readable storage medium of claim 11, wherein the substrate comprises one of aluminum, copper, tantalum, titanium, or a polymer.

20. An apparatus for processing a substrate, comprising:
a processing platform for processing a substrate; and
an extended spectroscopic ellipsometer operably coupled to a controller of the processing platform and the controller programmed to direct a beam toward a surface of a first layer of the substrate for determining in-situ ESE data therefrom during substrate processing, measure a change in determined in-situ ESE data, and prior to depositing a second layer atop the first layer, determine a level of contamination of the surface of the substrate using simultaneously complex dielectric function, optical conductivity, and electronic correlations from a measured change of phase and amplitude in the in-situ ESE data to provide an active endpoint feedback to ensure that there is minimum to no contact resistance between the second layer and the first layer.

* * * * *